United States Patent
Muthiah et al.

(10) Patent No.: US 6,890,999 B2
(45) Date of Patent: *May 10, 2005

(54) COATING POWDER OF EPOXY RESIN AND LOW TEMPERATURE CURING AGENT

(75) Inventors: Jeno Muthiah, Bartlett, PA (US); Jeremiah J. Teti, Virginia Beach, VA (US); Jacquelyn M. Schlessman, Temple, PA (US); William G. Ruth, Morgan Town, PA (US); Carryll A. Seelig, Reading, PA (US)

(73) Assignee: Rohm and Haas Company, Philadelphia, PA (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/279,392

(22) Filed: Oct. 24, 2002

(65) Prior Publication Data

US 2003/0149233 A1 Aug. 7, 2003

Related U.S. Application Data

(63) Continuation-in-part of application No. 09/706,178, filed on Nov. 3, 2000, now abandoned, which is a division of application No. 09/191,938, filed on Nov. 13, 1998, now abandoned, which is a continuation-in-part of application No. 09/111,419, filed on Jul. 7, 1998, now abandoned, which is a continuation-in-part of application No. 08/964,242, filed on Nov. 4, 1997, now abandoned.

(51) Int. Cl.$^7$ .......................... B05D 3/02; C08L 63/02; C08L 63/04
(52) U.S. Cl. ...................... 525/526; 427/386; 525/113; 525/438; 525/486; 525/523; 525/524; 525/934
(58) Field of Search ................................. 525/523, 526, 525/934, 113, 438, 486, 524; 427/386

(56) References Cited

U.S. PATENT DOCUMENTS

| | | | |
|---|---|---|---|
| 3,756,984 A | | 9/1973 | Klaren et al. ........... 260/47 EC |
| 3,860,541 A | | 1/1975 | Lehmann et al. ....... 260/18 PN |
| 4,421,897 A | * | 12/1983 | Gutekunst et al. .......... 525/119 |
| 4,678,712 A | * | 7/1987 | Elliott ......................... 428/418 |
| 5,077,355 A | | 12/1991 | Nagase et al. .............. 525/526 |
| 5,721,052 A | * | 2/1998 | Muthiah et al. ............. 428/413 |
| 6,060,539 A | | 5/2000 | Hermansen et al. ........ 523/400 |
| 6,077,610 A | * | 6/2000 | Correll et al. .............. 428/413 |
| 6,509,413 B1 | * | 1/2003 | Muthiah et al. ............. 525/113 |

FOREIGN PATENT DOCUMENTS

| | | | | |
|---|---|---|---|---|
| EP | 0 503 865 A2 | | 9/1992 | |
| EP | 503865 A2 | * | 9/1992 | ......... C09D/133/00 |
| JP | 07179564 A | * | 7/1995 | ........... C08G/59/06 |
| JP | 07-258384 | | 10/1995 | |
| JP | 07258384 A | * | 10/1995 | ........... C23C/14/32 |
| NL | 6806930 | | 11/1969 | |
| NL | 6806930 A | * | 11/1969 | |

OTHER PUBLICATIONS

Chetcuti et al., "Matting Agents for Powder Coatings," Southern Society for Coatings Technology, New Orleans, LA, Feb. 9–11, 1994, pp. 685–701.*

Chetcuti, Peter A.; "Matting Agents for Powder Coatings"; Waterborne & Higher Solids, and Powder Coatings Symposium Feb. 9–11, 1994; pp. 685–701.

Air Products, "Epoxy Curing Agents and Modifiers" Ancamine™ 2441 Curing Agent, Publication 125–9727, Sep., 1998, 8 pages.

* cited by examiner

Primary Examiner—Robert Sellers
(74) Attorney, Agent, or Firm—Andrew E. C. Merriam

(57) ABSTRACT

A mixture of a self-curing epoxy resin having an equivalent weight of from about 100 to about 700, a melt viscosity of from about 200 to about 2000 centipoise at 150° C. and a low temperature curing agent capable of maintaining its own domain during extrusion which is extruded as one component at a temperature below 220° F. and the extrudate is cooled and pulverized to form a low temperature curable coating powder. The powder cures at a temperature of from about 225 to about 300° F. and produces a coating having an exceptionally smooth surface with either a low or high gloss. The powder is particularly useful for coating heat sensitive substrates such as plastics, paper, cardboard and wood.

19 Claims, No Drawings

COATING POWDER OF EPOXY RESIN AND LOW TEMPERATURE CURING AGENT

This application is a Continuation-in-part (CIP) of U.S. application Ser. No. 09/706,178, filed Nov. 3, 2000, now abandoned, which is a divisional of U.S. application Ser. No. 09/191,938 filed Nov. 13, 1998, now abandoned, which is a CIP of U.S. application Ser. No. 09/111,419 filed Jul. 7, 1998, now abandoned, which is a CIP of application Ser. No. 08/964,242 filed Nov. 4, 1997, now abandoned.

BACKGROUND OF THE INVENTION

This invention relates to a powder coating system in which a mixture of an epoxy resin and a low temperature curing agent is extruded as one component and pulverized to form a low temperature curable coating powder. The powder cures at a temperature of from about 225° F. to about 300° F. and produces a coating having an exceptionally smooth surface with either a low or high gloss. This invention also relates to the electrostatic coating of massive metal articles and wood and low temperature curing to achieve a pleasing smoothness. It also relates to a method for compounding a coating powder by extruding a mixture comprising an epoxy resin having a low melt viscosity and a low temperature curing agent at a temperature of from about 160° F. to about 220° F. (about 71–104° C.).

Traditionally, coating powders have been made by the extrusion of a mixture of resins and curing agents to obtain a homogeneous mixture and then grinding the extrudate and screening the comminuted product to obtain the desired particle sizes and particle size distribution. The powder is then electrostatically sprayed onto a substrate, traditionally a metal substrate, and cured at temperatures much higher than 200° F. Achieving a powder coating composition that will cure on heat sensitive substrates at less than 300° F. in less than 5 minutes has long been a goal of the industry. The curing of powder coatings on materials such as wood, plastic, and the like has been limited by the fact that the extrusion of a mixture of a resin and a low temperature curing agent, i.e., one that is active at 250° F. or less, would cause the coating powder to gel in the extruder because the extrusion typically generates enough heat to raise the temperature to 200° F. or higher.

This problem has been avoided by extruding the resin and a small amount of catalyst or low temperature curing agent, about 0.1 to 8 phr (per hundred parts resin), which is insufficient to cause substantial curing of the resin during extrusion, grinding the extrudate, and then blending the resultant powder with an additional amount of the curing agent in powder form to form a coating powder.

The high temperatures that are generated by the extrusion of a curing agent with a resin are caused in part by the fact that the temperature must be sufficient to facilitate the mixing of resins having initially high melt viscosities. Even higher temperatures are produced by the friction arising from the mixing of the still highly viscous molten resins with curing agents that are solid at room temperature.

Douglas S. Richart said in his article published in the April, 1996 issue of *POWDER COATINGS*, that the coating of wood with a low temperature cure powder is next to impossible because the coating must be cured at a temperature below 200° F. and the resin must have a flow temperature of about 10 to 20 degrees lower than that. Resins having lower melt viscosities, however, generally have lower glass transition temperatures. The presence of a resin having a very low $T_g$ in the powdered extrudate increases the tendency to sinter and thus decreases the blocking resistance of the powder during storage at the normal maximum temperature of about 80° F. (27°C.).

SUMMARY OF THE INVENTION

It is an object of this invention, therefore, to provide a method for extruding a one-component low temperature curable coating powder.

It is a related object of this invention to provide a one-component low temperature curable coating powder that has satisfactory blocking resistance during storage at normal temperatures.

It is a related object of this invention to provide a one-component low temperature curable coating powder for heat sensitive substrates and massive metal articles.

It is another object of this invention to provide a low temperature process for producing a smooth, high gloss coating on wood.

These and other objects of the invention which will become apparent from the following description are achieved by a method for preparing a thermosetting coating powder comprising extruding a mixture of an epoxy resin having a melt viscosity of from about 200 to about 2000 centipoise at 150° C. and a curing agent, which is solid at 80° F. and latent at an extrusion temperature of from about 160° F. to about 220° F. and which maintains its own domain during extrusion, cooling the extrudate, and comminuting it. In an another embodiment of the present invention, the method for preparing a thermosetting coating powder comprises extruding a mixture of an epoxy resin having a melt viscosity of from about 200 to about 2000 centipoise at 150° C., a curing agent, which is solid at 80° F. and latent at an extrusion temperature of from about 160° F. to about 220° F. and which maintains its own domain during extrusion, and an acid functional matting agent, cooling the extrudate, and comminuting it,. The matting agent may also be added after extrusion, followed by cooling the extrudate, i.e. as a post blend additive which is incorporated into the powder coating by comminuting the mixture

DETAILED DESCRIPTION OF THE INVENTION

For the purpose of describing the proportions of components in the compositions of this invention, the term resin includes the resin per se and the curing agent but not the catalyst. Also, the term "one component coating powder" means that the powder is fully formed by grinding and screening only one extrudate of a mixture of the resin, curing agent, catalyst, and additives.

Epoxy resins which are suitable for the purposes of this invention have an equivalent weight of from about 100 to about 700. Mixtures of such epoxy resins may be used. A suitable mixture may comprise an epoxy resin having an equivalent weight between about 100 and 400 and one having an equivalent weight between 400 and about 700 in a weight ratio of from 1:99 to 99:1. The resins are exemplified by, but not limited to, those produced by the reaction of epichlorohydrin and a bisphenol, e.g., bisphenol A and bisphenol F. The low melt viscosities of these resins facilitate the extrusion of them in admixture with a curing agent, additives and pigments at about 160–220° F. The preferred melt viscosity is from about 300 to about 1000 centipoise. The melt viscosity of resins having a low $T_g$, i.e., from about 35° C. to about 55° C., is suitable for the purposes of this invention. Epoxy resins known as EPN (epoxy phenol novolac) and ECN (epoxy cresol novolac) resins and those made by the reaction of isopropylidenediphenol (bisphenol A) with epichlorohydrin are suitable for the purposes of this invention. Bisphenol A epoxies are sold under the trademarks ARALDITE GT-7071, GT-7072, EPON 1001 and EPON 2042. ARALDITE GT-6259 is the trademark for an ECN resin.

The use of a crystalline epoxy may improve the flow characteristics of the fused coating powder and, therefore, the smoothness of the fused and cured coating. A particularly desirable flow is achieved when a crystalline epoxy constitutes from about 5 to about 20% by weight of the total amount epoxy resin used in the formulation of the powder. The performance of a coating powder of this invention deteriorates as the level of crystalline epoxy resin therein is increased because of the relatively low equivalent weights of such resins and the preferred amount of such a resin is about 10% or less for that reason. A crystalline epoxy resin having a melting point between about 80° C. and about 150° C. is preferred. A crystalline epoxy resin having an equivalent weight of about 185 and sold by Shell under the trademark RSS 1407 is suitable for the purposes of this invention.

When resins having a $T_g$ of from about 35° C. to about 40° C., are used in this invention, sintering of the powder is avoided by allowing the temperature in the extruder to rise to activate the low temperature curing agent for a time sufficient to raise the extrudate's viscosity beyond the sintering point and then cooling the extrudate rapidly to about 10–20° C. (about 50–70° F.) before chipping and grinding it and storing the powder at such temperature to avoid a further viscosity build-up by continued curing. Another way to avoid sintering of the powder when low $T_g$ resins are used is to pre-mix the resin with a crystalline or non-crystalline curing agent powder having an average particle size such that the low temperature curing agent of the present invention that is capable of maintaining its own domain during extrusion.

A powdered agent does not react with a resin so readily as does the same curing agent in flake form, which allows a suitable powdered curing agent to retain its own domain during extrusion. Selection of a suitable powdered low temperature curing agent depends, among other things, upon the particle size, the melting or softening point and the reactivity of the curing agent. Low temperature curing agents should have a sufficient average particle size so that they do not liquefy in the extruder and yet allow sufficient reactivity to cure at temperatures of 225 to 300° F. For example, a curing agent may desirably have an average particle size of 1 to 4 microns if the curing agent is active at from 275° F. to 300° F., or it may have an average particle size of from 4 to 10 microns if the curing agent is active at 225° F. or if the curing agent melts or softens at between 80° F. and 90° F., i.e. has a low melting or softening point. The average particle size of a powdered low termperature curing agent which is solid at 80° F., as determined by laser light scattering, may range from 1 to 15 microns, preferably from 2 to 6 microns, and more preferably from 3 to 4 microns. A specific example of a curing agent that may so used in powdered form is sold under the trademark ANCAMINE® 2441, an epoxy resin adduct of an aliphatic polyamine sold by Air Products & Chemicals, which has an average particle size of from 3 to 4 microns.

The low temperature curing agent of this invention is one that will be active at a temperature of from about 225 to 300° F. and may be selected from among the many that are commercially available but an epoxy adduct of an aliphatic polyamine (including cycloaliphatic polyamines) having a primary, secondary, or tertiary amino group or a combination of such amino groups is a suitable curing agent for the purposes of this invention. Examples of such curing agents include hardeners sold under the trademarks PF LMB® 5218 (Ciba Geigy), ANCAMINE® 2337 XS, ANCAMINE® 2014 AS, and ANCAMINE 2441® (Air Products & Chemicals). An epoxy adduct of an aromatic polyamine, such as methylene dianiline, is also a suitable curing agent for the purposes of this invention. It is preferred that the functionality of the adducting reaction mixture is 2 or less and it is particularly preferred to use a difunctional epoxy compound. The amount of low temperature curing agent is from about 2 to about 40 parts per hundred parts of the resin (phr) and the preferred amount is from about 5 to about 20 phr. Increasing levels of the curing agent reduce the gel time and, therefore, increase the orange peel effect.

A tertiary amine such as triethylamine diamine, available under the trademark ACTIRON® SI 27071 from Synthron Chemicals, is another type of curing catalyst that may be used in this invention.

A catalyst may be used at a level of from about 0.1 to about 5 parts per hundred parts of the resin (phr), preferably about 0.2–2 phr to accelerate the curing reaction with the low temperature curing agent. Preferred catalysts for this invention are imidazoles and epoxy adducts thereof, the imidazoles having the general formula:

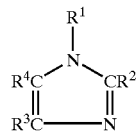

wherein $R^1$, $R^2$, $R^3$, and $R^4$ are independently hydrogen, alkyl, aryl, or any substituent which is not reactive with the epoxy resin. For the purposes of this invention, the term imidazole is used herein to mean both the substituted and unsubstituted imidazoles. Imidazoles, in themselves, tend to be insoluble in epoxy resins. Thus, epoxy adducts are made to make them more compatible with the epoxy system of this invention. Suitable adducts of such imidazoles with a bisphenol A epoxy resin are available commercially from Shell Chemical Company under its trademark EPON, e.g., EPON P-101, and also from Ciba-Geigy Corporation under its designation HT 261. Examples of suitable imidazoles include imidazole, 2-methyl imidazole, and 2-phenyl imidazole. For enhanced color stability, the 2-phenyl imidazole, which is available from the SWK Chemical Co., is preferred. A particularly hard surface is obtained when a combination of the ANCAMINE 2441 curing agent and 2-phenyl imidazole is used to cure an epoxy resin having a medium $T_g$ and melt viscosity.

Although applicants are not bound by any theory, it is believed that an imidazole adducts to an epoxy resin by an opening of the epoxy ring that results in the epoxy oxygen bonding to the C=N bond of the imidazole ring. The adducted imidazole moves from one epoxy group to another as it facilitates epoxy ring openings and cure reactions.

Various gloss levels for the cured coating may be achieved through the choice of epoxy resins, curing agents, curing catalysts and the relative amounts of each. A low gloss may be achieved, for example, by the use of a combination of dicyandiamide (a slow acting curing agent) and a fast acting agent to set up competitive reactions. A family of substituted ureas that are useful in latent one-pack systems with dicyandiamide is sold under the trademark OMICURE.

Curing temperatures in the range of 110–140° C. (230–280° F.) may be achieved with one-pack systems comprising substituted ureas with dicyandiamide according to the present invention. Substituted ureas provided in the present invention may include phenyl dimethyl urea, toluene bis dimethyl urea, methylene bis (phenyl dimethyl) urea, and a cycloaliphatic bisurea designated U-35.

The choice of curing agent for a low gloss coating in accordance with the present invention may be expanded by the use of acid-functional resins as matting agents in the formulation of the coating powders of this invention. For example, the P-101 imidazole/epoxy resin adduct named as a catalyst hereinabove may be used as a curing agent when such matting agents are used. An accelerated dicyandiamide sold as G 91 by Estron Chemical, Inc. may also be used as a curing agent at low temperatures in the presence of such matting agents to produce low gloss coatings. The OMIC-URE agents mentioned above may also be used in combination with said matting agents. Further, the amount of low temperature curing agent used in accordance with the present invention may be reduced somewhat in the presence of the acidic matting agents and this, too, has the effect of reducing gloss. Still further, as will be shown hereinafter, the smoothness attained by the incorporation of a crystalline epoxy resin, may also be attained in the absence of such a resin when a matting agent is used. Low gloss coatings on wood cured in this manner are among the few that pass the boiling water test of a major furniture maker.

A range of acidic matting agents may be used in accordance with the present invention. Polymers having an acid number of from 100 to 320 (mg KOH/g polymer as determined by the ASTM D 1639-90 method), preferably from 130 to 250, are useful in the present invention. The acidic matting agents of the present invention include those polymers having a $T_g$ of from 55 to 75° C., that is, high enough so that the matting agent does not cause blocking or form salts with amine curing agents and low enough to that the matting agent will have a favorable effect on smoothness without causing an orange peel effect. Examples of such matting agents include, without limitation, an acrylic resin having an acid number of 142±5 sold as G 151 by Estron, a polyester having an acid number of about 320 sold as EP-5600 by Ruco Polymer Corp., an acid-functional acrylic resin sold as SCX 880 by S. C. Johnson, and a low molecular weight, tetracarboxyl-functional polyester sold as DT 3357 by Ciba. The amount of matting agent is from about 2 phr to about 20 phr, preferably from about 5 to about 15 phr. The matting agents according to the present invention may be part of a one component thermosetting powder or, alternatively, they may be added as a solid or post-blend additive or second powder component, i.e. which is ground into into a thermosetting coating powder according to the present invention, e.g. after cooling the coating powder by comminuting them together.

That the choice of epoxy resin is important to the gloss level is shown by the following: A fused and thermally cured powder coating made from an epoxy resin having an equivalent weight of about 400 may have a 60° gloss level as low as about 10 whereas a gloss level of about 90 may be achieved when the equivalent weight is about 650 and the curing agent and curing catalyst are changed.

The coating powder may also contain a flow control agent in the range of from about 0.5 to about 2.0 phr. Examples of the flow control agents include the MODAFLOW poly (alkylacrylate) products and the SURFYNOL acetylenic diols; they may be used singly or in combination. Anti-oxidants may also be used at a concentration of from about 0.5 to about 2.0 phr to prevent the discoloration of the coatings even at the relatively low curing temperatures suitable for the purposes of this invention. Examples of the anti-oxidants that are useful in this invention include sodium hypophosphite, tris-(2,4-di-t-butyl phenyl) phosphite (sold under the trademark IRGAFOS 168), and calcium bis ([monoethyl(3,5-di-t-butyl-4-hydroxybenzyl)phosphonate] (sold under the trademark IRGANOX 1425). Mixtures of anti-oxidants may be used.

The powder of this invention may be used in coating glass, ceramics, and graphite-filled composites as well as metallic substrates such as steel and aluminum. Much heat is wasted by heating thick or massive metal articles in order to raise the surface temperature to the high levels required by conventional coating powders. The particular utility of the powder of this invention, however, in the coating of heat sensitive substrates such as plastics, paper, cardboard and woods makes it highly appealing as a commercially viable alternative to the liquid coatings that have been almost universally used in the past. For the purposes of this invention, wood is defined as any lignocellulosic material whether it comes from trees or other plants and whether it be in its natural form, milled, or made into plywood, particle board, or fiberboard of various densities. It is exemplified by lumber, panels, molding, siding, oriented strand board, hardboard, and medium density fiberboard (MDF). The particle board may be standard or treated to enhance its electrical conductivity. Wood having a moisture content of from 3 to 10% by weight is suitable for the purposes of this invention. A porous particleboard, pre-coated with a conductive liquid coating composition and cured, may also serve as a substrate for the coating powder of this invention. For example, a smooth 2–3 mil thick powder coating is achieved on a 0.5 to 1 mil thick UV or thermally cured pre-coat.

Pigments, optical brighteners, fillers such as calcium carbonate and bentonite clays, texturizing agents such as particulate rubber, and other conventional additives may also be present. A particularly desirable textured finish may be obtained by the addition of from about 14 to about 20 phr of the rubber to the coating composition along with calcium carbonate at a rubber to carbonate ratio of from about 0.7:1 to about 1.5:1 by weight. Titanium dioxide, in an amount of from about 5 to about 50 phr or more, is an example of a pigment that may be used. An optical brightener, exemplified by 2,2'-(2,5-thiophenediyl)bis[5-t-butylbenzoxazole], sold under the trademark UVITEX OB, may be present at from about 0.1 to about 0.5 phr.

The coating powder of this invention may be applied by any of the conventional powder coating methods.

Flat-surfaced and grooved panels may be coated by triboelectric guns on a flat line conveyor having electrically conductive bands around the circumference of the conveyor belt. A suitable flat line powder coating apparatus comprises such a conveyor extending through a powder coating booth, wherein a wooden article supported and moved by the conveyor belt is coated triboelectrically by a plurality of guns situated adjacent one another and in one or more tiers. The article bearing the powder is then conveyed through a curing oven having several heating zones, some of which are heated by IR lamps, others by heat convection, and still others by a combination of those two. The coating and curing line speeds may be the same or different depending on the length of the curing oven. The line speed through the powder application booth may be from about 5 to about 150 feet per minute but it is preferably from about 20 to about 100 feet per minute. The line speed through the curing oven, on the other hand, may be from about 5 to about 20 feet per minute, depending on the oven temperature and the particular coating powder used. The curing temperature may range from about 225° F. up to but not including the decomposition temperature of the powder. It is preferred to maintain the cure temperature within the range of from about 225° to about 300° F. and still more preferred to keep the cure temperature at from about 225 to about 250° F. It is preferred that the coating and curing line speeds be adjusted to the oven length so that they are balanced. For example, curing times in accordance with the present invention may range from 30 seconds at the highest curing temperatures to 30 minutes at the lowest curing temperatures, preferably from 1 to 20 minutes, more preferably from 3 to 13 minutes.

Preheating of the panel before the coating step is preferred in some instances, e.g., to help the powder reach its flow temperature in the first zone of the oven and it also minimizes outgassing during cure. The oven may have several heating zones of the IR and convection types and also a combination of the two. The film thickness of the cured coating is at least about 1 mil and it may be as much as about 8 mils or even higher if there is a practical need for such. Film thicknesses of from about 4 to about 6 mils are achieved regularly by the method of this invention.

The gel time of the coating powder of this invention was measured according to ASTM Specification D-3451 (14) in which a small quantity of powder was dropped onto a hot plate at 300° F. (149° C.) and stroked with a tongue depressor until continuous and readily breakable filaments were formed when the depressor was lifted from the sample. The elapsed time for this to occur was measured in seconds and is the gel time.

The blocking resistance of a coating powder is tested by placing about 1 inch of the powder in a tube, placing a 100 gram load on top of the powder and heating it at 110° F. for 24 hours. Upon removal of the contents of the tube, the degree of sintering is measured on a scale of 1 to 10, 1 being completely free-flowing and 10 being non-flowing. Powders having a value of less than 5 are acceptable.

The hot plate melt flow (HPMF) of the powder coating composition of this invention was measured by placing a pellet of powder having a diameter of 12.7 mm and 6 mm thick on a hot plate set at 375° F. (190±2° C.) at an inclination angle of 35°. When the pellet melts and runs down the plate, the length of the flow is measured in millimeters. The flow distance is dependent on the initial melt viscosity, the rate of reaction, the temperature at which the test is conducted, and the type and amount of catalyst.

The Hoffman scratch resistance of the coated articles made according to this invention was measured with the Byk-Gardner scratch tester.

The Taber abrasion resistance of the coated articles made according to this invention was measured according to ASTM D-4060 using CS-10 wheels and a 1000 gram load.

The invention is more specifically described in the following working examples wherein parts are by weight unless otherwise stated.

EXAMPLES 1–3

Three resins of increasing viscosity and increasing $T_g$, as shown in Table A, were melt compounded with polyamine adducts and the other components shown in Table 1 in a twin screw extruder. The extrudate was cooled between water cooled rollers, broken into chips, and then ground into a powder. Powder passing through a 200 mesh screen was electrostatically coated on cold rolled steel Q-panels and cured at 300° F. for 5 minutes to obtain a film thickness of 2–3 mils. As shown in Table 2, the superior solvent resistance and blocking resistance of Examples 1–3 demonstrates that faster cure is achieved using this technology. The extrudate temperatures and the properties of the uncured and cured powders are given in Table 2.

TABLE A

| Curing agent | Tg ° C. | Viscosity (cps at 150° C.) |
|---|---|---|
| GT-7071 | 38 | 500 |
| GT-7072 | 54 | 1100 |
| GT-7013 | 60 | 2700 |

TABLE 1

| Component | Example 1 | Example 2 | Example 3 |
|---|---|---|---|
| GT-7071 | 85 | | |
| GT-7072 | | 85 | |
| GT-7013 | | | 85 |
| Curing Agent * | 15 | 15 | 15 |
| Catalyst * * | 2.0 | 2.0 | 2.0 |
| Titanium Dioxide | 30.0 | 30.0 | 30.0 |
| Antioxidant * * * | 1.0 | 1.0 | 1.0 |
| SURFYNOL 104S | 1.0 | 1.0 | 1.0 |
| MODAFLOW 2000 | 1.0 | 1.0 | 1.0 |
| UVITEX OB | 0.1 | 0.1 | 0.1 |

* LMB 5218 Epoxy/Polyamine;
* * EPON P-101 Epoxy/Imidazole;
* * * Sodium Hypophosphite

TABLE 2

| Component | Example 1 | Example 2 | Example 3 |
|---|---|---|---|
| Extrudate temp | 160° F. | 180° F. | 200° F. |
| Gel time(300° F.) | 30 sec | 23 sec | 22 sec |
| HPMF 375° F. | 80 mm | 15 mm | 13 mm |
| Blocking | 2 | 2 | 2 |
| MEK Resistance | 4 | 4 | 4 |
| 60° Gloss | 88 | 56 | 50 |
| Orange Peel | Slight | Heavy | Heavy |

Table 2 shows the significant reduction in the temperature that the extrudate reaches when a low viscosity epoxy resin is used. The shorter gel times for the powders containing the more viscous resins are caused by the partial curing of the resin in the extruder at the higher temperatures.

EXAMPLES 4–6

The use of non-adducted imidazoles as a curing catalyst, the practice of the invention without a curing catalyst, and the use of a high temperature curing agent in combination with a low temperature curing agent and a catalyst are illustrated by the compositions and properties thereof shown in Tables 3 and 4.

TABLE 3

| Component | Example 4 | Example 5 | Example 6 |
|---|---|---|---|
| GT 7071 resin | 85 | 80 | 85 |
| LMB 5218 | 15 | 20 | 15 |
| Imidazole | 2 | | |
| 2-Me-imidazole * | | | 0.2 |
| Dicyandiamide | | | 5.0 |
| TiO$_2$ | 30.0 | 30.0 | 30.0 |
| Antioxidant * * | 1.0 | 1.0 | 1.0 |
| SURFYNOL 104S | 1.0 | 1.0 | 1.0 |

TABLE 3-continued

| Component | Example 4 | Example 5 | Example 6 |
|---|---|---|---|
| MODAFLOW 2000 | 1.0 | 1.0 | 1.0 |
| UVITEX OB | 0.1 | 0.1 | 0.1 |

* Me = methyl
* * Sodium Hypophosphite

TABLE 4

| Properties | Example 4 | Example 5 | Example 6 |
|---|---|---|---|
| Extrudate temp | 150 | — | 160 |
| Gel Time 300° F. | 25 sec | 25 sec | 26 sec |
| HPMF 375° F. | 150 mm | 25 mm | 38 mm |
| Blocking Resistance | 3 | 2 | 2 |
| MEK Resistance | 5 | 3–4 | 4 |
| 60° Gloss | 8s | 45 | 34 |
| Orange Peel | Slight | Moderate | Slight |

The properties of the coating powder containing imidazole as the catalyst recommend it for use where fast cures are required, as in the coating of reinforcing bars, for example; it has the best cure, as indicated by its MEK resistance, and its flow properties are extraordinarily good.

EXAMPLES 7–9

The following examples illustrate the performance of curing agents containing secondary and tertiary amino groups. The coating powder passing through a 200 mesh screen was sprayed from a tribocharging gun onto 1" thick medium density fiberboard (MDF) panels which had been pre-heated in a 350° F. oven for 10 minutes to a surface temperature of 240° F. The powder coating was cured by heating the panels at 350° F. for 5 minutes to reach a surface temperature of 280° F.

TABLE 5

| COMPONENT | Example 17 | Example 18 | Example 19 |
|---|---|---|---|
| EPON 2042 resin | 70 | | |
| ANCAMINE 2014 AS | 20 | | |
| RSS 1407 resin | 10 | | |
| EPON P-101 | 2.0 | | |
| MODAFLOW 2000 | 1.0 | 1.0 | 1.0 |
| SURFYNOL 104S | 1.0 | 1.0 | 1.0 |
| Antioxidant * | 1.0 | 1.0 | 1.0 |
| TiO$_2$ | 30 | 30 | 30 |
| ANCAMINE 2441 | | 10 | 10 |
| 2-phenylimidazole | | | 2.0 |
| GT 7072 resin | | 100 | 100 |

* Sodium hypophosphite

TABLE 6

| PROPERTY | Example 7 | Example 8 | Example 9 |
|---|---|---|---|
| Gel Time (300° F.) | 30 sec | 90 sec | 35 sec |
| HPMF | 43 (mm) | 90 (mm) | 75 (mm) |
| MEK Resistance | 3 | 4 | 5 |
| 60° Gloss | 35 | 60 | 95 |
| Hoffman Scratch | 1,200 grams | 1,000 grams | 2,000 grams |
| Taber Abrasion | 36 mg | 72 mg | 69 mg |

COMPARATIVE EXAMPLE 1

A two-component epoxy powder coating composition described in Example 9 of commonly assigned, co-pending application filed Mar. 4, 1997 as Ser. No. 810,745 was prepared for comparison with the composition of this invention. Components A and B of the formulation shown in Table 7 are extruded separately and then ground and classified in the usual manner. Sixty-five parts by weight of Component A and 35 parts of Component B were blended to form the coating powder composition of Comparative Example 1. The powder of Comparative Example 1 was applied to a wooden panel that had been pre-heated to a panel temperature of 220–230° F. and was cured at a panel temperature of 270–280° F. for about 5 minutes. The properties of the cured coating are shown in Table 8.

TABLE 7

| Ingredient | Component A | Component B |
|---|---|---|
| GT-7072 (melt visc. 54) | 100 | — |
| 2-phenyl imidazole | 2.0 | — |
| MODAFLOW 2000 | 1.0 | 2.0 |
| SURFYNOL 104S | 1.0 | 30.0 |
| LMB 5218 curing agent | — | 100 |
| Titanium Dioxide | 30.0 | 30.0 |
| Polyethylene (Grade 6A) | 2.0 | 2.0 |
| Sodium Hypophosphite | 1.0 | 1.0 |
| Optical brightener | 0.1 | 0.1 |

TABLE 8

| Gel time | 25 seconds |
|---|---|
| HPMF | 60 mm |
| MEK resistance | 4 |
| 60° gloss | 15 |
| Hoffman scratch resistance | 500 grams |
| Taber abrasion | 120 mg |

EXAMPLES 10–12

The following examples illustrate the combined effects of curing agents having different rates and epoxy resins having low and high equivalent weights on the gloss of powder coatings of this invention. The coating powder passing through a 200 mesh screen was sprayed from a tribocharging gun onto 1" thick medium density fiberboard (MDF) panels which had been pre-heated in a 350° F. oven for 10 minutes to a surface temperature of 240° F. The powder coating was cured by heating the panels at 350° F. for 5 minutes to reach a surface temperature of 280° F.

TABLE 9

| COMPONENT | Example 10 | Example 11 | Example 12 |
|---|---|---|---|
| GT-6259 resin * | 100 | 50 | 50 |
| GT-7072 resin ** | — | 50 | 50 |
| ANCAMINE 2014 AS | 20 | 20 | 10 |
| ANCAMINE 2441 | — | — | 5 |
| EPON P-101 | 2.0 | 2.0 | 2.0 |
| MODAFLOW 2000 | 1.0 | 1.0 | 1.0 |
| SURFYNOL 104S | 1.0 | 1.0 | 1.0 |
| Antioxidant *** | 1.0 | 1.0 | 1.0 |
| TiO$_2$ | 30 | 30 | 30 |

* Eq Wt. ~400;
** Eq Wt ~650
*** Sodium hypophosphite

TABLE 10

| PROPERTY | Example 10 | Example 11 | Example 12 |
|---|---|---|---|
| Gel Time (300° F.) | 11 sec | 11 sec | 15 sec |
| HPMF | 48 mm | 39 mm | 50 mm |
| MEK Resistance | sl rub off | sl rub off | sl rub off |
| 60° Gloss | 15 | 25 | 70 |
| Hoffman Scratch | 300 grams | 300 grams | 200 grams |
| Taber Abrasion | 82 mg | 64 mg | 71 mg |
| Smoothness | sl OP | sl OP | mod OP |

EXAMPLES 13–17

Coating powders formulated as shown in Table 11 were prepared by extrusion through a die set in an extruder having a 12 pin rotor operating at 300 rpm and whose front zone is at 120° C. and rear zone is cool. The extrudate is cooled, chipped and ground to pass through a 200 mesh screen. The resulting powder was sprayed electrostatically from a tribo-charging gun onto 1″ thick medium density fiberboard (MDF) panels which had been pre-heated in a 350° F. oven for 10 minutes to a surface temperature of 240° F. The powder coating was cured by heating the panels at 350° F. for 5 minutes to reach a surface temperature of 280° F. The thickness of the coating was 4–7 mils.

TABLE 11

| COMPONENT | Ex 13 | Ex 14 | Ex 15 | Ex 16 | Ex 17 |
|---|---|---|---|---|---|
| GT-6259 resin | 100 | — | 50 | 50 | 50 |
| GT-7072 resin | — | 100 | 50 | 50 | 50 |
| ANCAMINE 2014 AS | 20 | 20 | 20 | 5 | 20 |
| ANCAMINE 2441 | — | — | 5 | 10 | — |
| EPON P-101 | 2.0 | 2.0 | 2.0 | 2.0 | 2.0 |
| MODAFLOW 2000 | 1.0 | 1.0 | 1.0 | 1.0 | 1.0 |
| SURFYNOL 104S | 1.0 | 1.0 | 1.0 | 1.0 | 1.0 |
| Antioxidant * | 1.0 | 1.0 | 1.0 | 1.0 | 1.0 |
| TiO$_2$ | 30 | 30 | 30 | 30 | 30 |

* Sodium hypophosphite

TABLE 12

| PROPERTY | Ex 13 | Ex 14 | Ex 15 | Ex 16 | Ex 17 |
|---|---|---|---|---|---|
| Extrudate Temp | 165–175 | 180–190 | 175–180 | 175–185 | 175–185 |
| Gel Time 300° F. | 11 sec | 13 sec | 11 sec | 15 sec | 16 sec |
| HPMF mm | 48 | 36 | 39 | 50 | 88 |
| MEK Resistance | 4+ | 4 | 4+ | 5 | 4+ |
| 60° Gloss | 15 | 26 | 25 | 70 | 17 |
| Hoffman Scratch | 300 grams | 300 grams | 300 grams | 200 | — |
| Taber Abrasion | 82.2 mg | 75.9 mg | 63.7 mg | 71.4 | 54.3 |
| Smoothness | sl OP | mod OP | sl OP | mod OP | no OP |

EXAMPLES 18–22

Coating powders formulated as shown in Table 13 were prepared by extrusion through a die set in an extruder having a 12 pin rotor operating at 300 rpm and whose front zone is at 120° C. and rear zone is cool. The extrudate is cooled, chipped and ground to pass through a 200 mesh screen. The resulting powder was sprayed electrostatically from a tribo-charging gun onto medium density fiberboard (MDF) panels which had been pre-heated in a 350° F. oven for 10 minutes to a surface temperature of 240° F. The powder coating was cured by heating the panels at 350° F. for 5 minutes to reach a surface temperature of 280° F. As can be seen in Table 14, both G 151 and XP 5600 produce coatings with a matte finish at low temperature on MDF. Despite the absence of a crystalline epoxy resin in the product of Example 21, the smoothness of the cured coating was good.

TABLE 13

| COMPONENT | Ex 18 | Ex 19 | Ex 20 | Ex 21 | Ex 22 |
|---|---|---|---|---|---|
| GT-7072 resin | 90 | 90 | 90 | 100 | 70 |
| RSS 1407 resin | 10 | 10 | 10 | — | 10 |
| 2-Phenyl Imidazole | 1 | 1 | 1 | 1 | 1 |
| ANCAMINE 2441 | 10 | 7 | 7 | 7 | 7 |
| MODAFLOW 2000 | 1 | 1 | 1 | 1 | 1 |
| SURFYNOL 104S | 1 | 1 | 1 | 1 | 1 |
| Antioxidant* | 1.0 | 1.0 | 1.0 | 1.0 | 1.0 |
| G 151 Matting Agent | 10 | 10 | 17 | 10 | — |
| XP 5600 Matting | — | — | — | — | 20 |
| Red 3B | 0.066 | 0.066 | 0.132 | — | — |
| 2 RLT Yellow | 0.15 | 0.15 | 0.3 | — | — |
| Raven 22 Black | 0.007 | 0.007 | 0.014 | 1.09 | — |
| 3420 Yellow | — | — | — | 0.46 | — |
| RO 3097 Red | — | — | — | 0.35 | — |

* Sodium hypophosphite

TABLE 14

| PROPERTY | Ex 18 | Ex 19 | Ex 20 | Ex 21 | Ex 22 |
|---|---|---|---|---|---|
| Gel Time (xxx ° F.) | 45 sec | 52 sec | 25 sec | 59 sec | 18 sec |
| HPMF (mm) | — | — | — | 69 | 66 |
| MEK Resistance | 4 | 4 | 5 | 3 | 4 |
| 60° Gloss | 23 | 16 | 7 | 10 | 17 |
| Smoothness | good | good | good | good | good |
| Cross Hatch Adhesion | — | — | — | — | 4B |

What is claimed is:

1. A thermosetting one component coating powder which cures at a temperature of from about 225 to about 300° F. and comprises an extruded mixture of an epoxy resin having a melt viscosity of from about 200 to about 2000 centipoise at 150° C. and a powdered low temperature curing agent which has an average particle size of from 1 to 15 microns and which is solid at about 80° F., wherein the said epoxy resin comprises a mixture of an epoxy resin having an equivalent weight of from 100 to 400 and an epoxy resin having an equivalent weight of from 400 to 700.

2. The powder of claim 1 wherein the low temperature curing agent is an epoxy resin adduct of an aliphatic polyamine.

3. The powder of claim 1 further comprising an imidazole having the general formula:

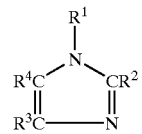

wherein $R^1$, $R^2$, $R^3$, and $R^4$ are independently hydrogen or any substituent which is not reactive with the epoxy resin, or an epoxy adduct of said imidazole.

4. The powder of claim 1 wherein from about 5 to about 20 by weight of the epoxy resin is crystalline.

5. The powder of claim 2 wherein the aliphatic polyamine contains a primary or a secondary amino group.

6. The powder of claim 3 wherein $R^2$ is methyl or phenyl, and $R^1$, $R^3$, and $R^4$ are hydrogen.

7. The powder of claim 1 further comprising an acid-functional matting agent as part of said extruded mixture or as a second powder component.

8. A method for preparing a one component thermosetting coating powder which comprises extruding a mixture as claimed in claim 1 at a temperature of from about 160° F. to about 220° F., cooling the extrudate and comminuting it.

9. The method of claim 8 wherein said low temperature curing agent is an epoxy resin adduct of a polyamine.

10. The method of claim 8 wherein an imidazole catalyst having the general formula:

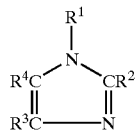

wherein $R^1$, $R^2$, $R^3$, and $R^4$ are independently hydrogen or any substituent which is not reactive with the epoxy resin, or an epoxy resin adduct of said imidazole, is added to the extrusion mixture.

11. The method of claim 8 wherein from about 5 to about 20 by weight of the epoxy resin is crystalline.

12. The method of claim 10 wherein $R^2$ is methyl or phenyl, and $R^1$, $R^3$, and $R^4$ are hydrogen.

13. The method of claim 8 wherein said mixture further comprises an acid-functional matting agent.

14. The method of claim 8 further comprising adding an acid-functional matting agent to the cooled extrudate prior to said comminuting.

15. A method for preparing a one component thermosetting coating powder which comprises extruding a mixture as claimed in claim 1 at a temperature of from about 160° F. to about 220° F., cooling the extrudate and comminuting it.

16. A method for coating a heat sensitive substrate comprising applying a thermosetting coating powder as claimed in claim 1 onto a surface of the wood and heating the powder to a curing temperature of from about 225° F. to about 300° F., wherein said coating powder optionally contains an acid functional matting agent.

17. The method of claim 16 wherein the low temperature curing agent is an epoxy resin adduct of an aliphatic polyamine.

18. The method of claim 16 further comprising an imidazole having the general formula:

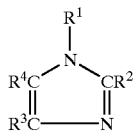

wherein $R^1$, $R^2$, $R^3$, and $R^4$ are independently hydrogen or any substituent which is not reactive with the epoxy resin, or an epoxy adduct of said imidazole.

19. The method of claim 16 wherein from about 5 to about 20 by weight of the epoxy resin is crystalline.

* * * * *